US007021709B2

(12) United States Patent
Dolan et al.

(10) Patent No.: US 7,021,709 B2
(45) Date of Patent: Apr. 4, 2006

(54) CHILD RESTRAINT SEAT ANCHORS WITH INTEGRATED CHILD SEAT DETECTORS

(75) Inventors: John R. Dolan, Woodhaven, MI (US); Romeo Joseph D. Garcia, Jr., Rochester Hills, MI (US); James A McKenzie, Haslett, MI (US)

(73) Assignee: General Motors Corporation, Detroit, MI (US)

( * ) Notice: Subject to any disclaimer, the term of this patent is extended or adjusted under 35 U.S.C. 154(b) by 166 days.

(21) Appl. No.: 10/719,084

(22) Filed: Nov. 20, 2003

(65) Prior Publication Data

US 2005/0121956 A1 Jun. 9, 2005

(51) Int. Cl.
*B60N 2/26* (2006.01)

(52) U.S. Cl. ...................................... 297/253; 280/735

(58) Field of Classification Search ................ 297/253; 280/735

See application file for complete search history.

(56) References Cited

U.S. PATENT DOCUMENTS

| | | | | |
|---|---|---|---|---|
| 5,690,356 | A | 11/1997 | Lane, Jr. | 280/735 |
| 5,992,879 | A * | 11/1999 | Bogge | 280/735 |
| 6,007,093 | A * | 12/1999 | Bechtle et al. | 280/735 |
| 6,250,672 | B1 * | 6/2001 | Ryan et al. | 280/735 |
| 6,264,236 | B1 * | 7/2001 | Aoki | 280/735 X |
| 6,371,516 | B1 * | 4/2002 | Miyagawa | 280/735 |
| 6,522,257 | B1 | 2/2003 | Jakob et al. | 340/686.1 |

* cited by examiner

*Primary Examiner*—Anthony D. Barfield
(74) *Attorney, Agent, or Firm*—Laura C. Hargitt

(57) ABSTRACT

The presence of a child restraint seat on a vehicle seat is detected by a child restraint seat anchor that is movable from a first position to a second position when a strap from the child restraint seat is coupled to the anchor. In accordance with the preferred embodiment, the movable anchor is slidably mounted in a housing and slides against the bias of at least one spring when the child restraint seat is coupled thereto. A micro switch is activated upon the moveable anchor sliding from the first position to the second position to cause an air bag controller to either deactivate or slow deployment of an air bag when the child seat is present.

20 Claims, 5 Drawing Sheets

CHILD RESTRAINT SEAT ANCHORS WITH INTEGRATED CHILD SEAT DETECTORS

FIELD OF THE INVENTION

The present invention is directed to child restraint seat anchors with integrated child seat detectors. More particularly, the present invention is directed to child restraint seat detection devices, which notify an air bag controller that a child restraint seat is present on a vehicle seat in order to either disable an air bag, or to slow the deployment speed of the air bag.

BACKGROUND OF THE INVENTION

A child being carried in a child restraint seat can be subjected to relatively high impact forces upon deployment of an air bag against the child, whether that air bag is a front air bag or a side curtain air bag. Accordingly, it is suggested that children beneath a selected size and weight not be subjected to impact by air bags. In some vehicles, manual switches are provided to deactivate air bag deployment systems when a child restraint seat is occupied by a child. A driver or passenger can forget to operate the manual switch when a child is seated, or the air bag can be left in a deactivated mode when an adult is seated.

This has led to arrangements for automatically deactivating air bags when the presence of a child rather than an adult in a vehicular seat is detected. Currently, these devices respond to the weight of a person occupying a front passenger seat, whether that person is an adult or a child, rather than responding to the mere presence of a child restraint seat. It has been found that some weight based suppression systems that are installed in the seat cushion of the right front passenger seats have difficulty correctly classifying "Lower Anchorage and Tether for Children" (LATCH) child restraint seats that are attached to the lower anchorages of the front passenger set. The reason for this difficulty is the inability of the suppression system to detect the amount of load being applied by the attached child restraint seat to the set cushion, which results in added weight measurement to the suppression system. This misclassification occurs when this added weight equals the amount of weight that an adult occupant would apply while seated in the right front passenger seat. It is not currently realized that the mere presence of a child restraint seat in almost all cases precludes occupancy of the passenger seat by an adult, who is less likely to experience ill effects from an air bag impact than an infant or small child. Accordingly, there is a need in systems, such as LATCH child restraint seat systems, for detection devices which recognize the mere presence of a child restraint seat and use that recognition to deactivate or alter deployment speeds of airbags.

SUMMARY OF THE INVENTION

The present invention is directed to an anchor device for child restraint seats that detects whether a child restraint seat is attached to a vehicle seat. The anchor device comprises a housing adapted to be fixed to the vehicle seat and a movable anchor having coupler and mounting portions, the coupler portion adapted to couple with a coupler on the child seat and the mounting portion being received in the housing. The movable anchor is shiftable within the housing from a first position, indicating that a child seat is not attached to the vehicle seat, to a second position indicating that a child seat is attached to the vehicle seat. At least one spring urges the movable anchor to the first position. A first stop is engaged by the movable anchor when the movable anchor is in the first position and a second stop is engageable by the movable anchor when the movable anchor has shifted to the second position. When engaged by the movable anchor, the second stop transfers force applied by the coupler of the child restraint seat to the vehicle seat. A switch is an operative association with the movable anchor and is adapted to connect to an air bag to disable deployment of the air bag, or reduce the speed of the air bag upon the movable anchor being moved to the second position, indicating presence of the child restraint seat.

In another aspect of the invention the movable anchor positively engages the second stop upon shifting to the second position.

In a further aspect of the invention, the switch is a normally open switch which is closed upon the movable anchor being shifted to the second position.

In still a further aspect of the invention the housing includes a chamber having an opening though a front wall, through which opening the coupler portion of the movable anchor extends. The chamber has a rear wall defining the first stop that is spaced a selected distance from the front wall, the front wall defining the second stop.

In another aspect, the invention is directed to an arrangement for attaching a child restraint seat to a frame of a seat back of a vehicle seat, wherein the arrangement comprises a pair of child seat anchors positioned in spaced relation to one another on the frame of the seat back. At least one of the anchors is a movable anchor disposed in a housing fixed to the seat back and being shiftable between a first position, indicating that a child seat is not attached, and a second position, indicating that a child seat is attached. At least one spring is disposed between the housing and the movable anchor for urging the movable anchor to the first position. A switch in operable association with the movable anchor is adapted for connection to an air bag to disable the deployment of the air bag or to modify deployment speed of the air bag upon the movable anchor being moved to the second position.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
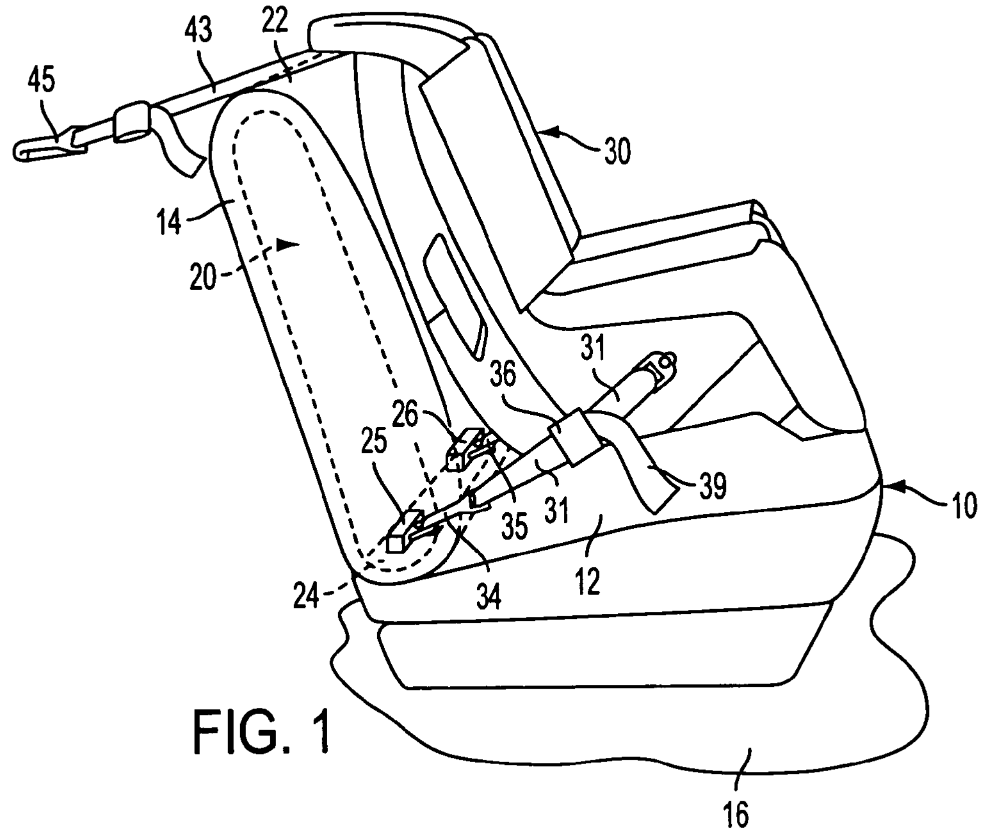
FIG. 1 is a side view showing a forward facing child restraint seat attached to a front vehicle seat by utilizing a mounting anchor configured in accordance with the principles of the present invention.
Figure 2:
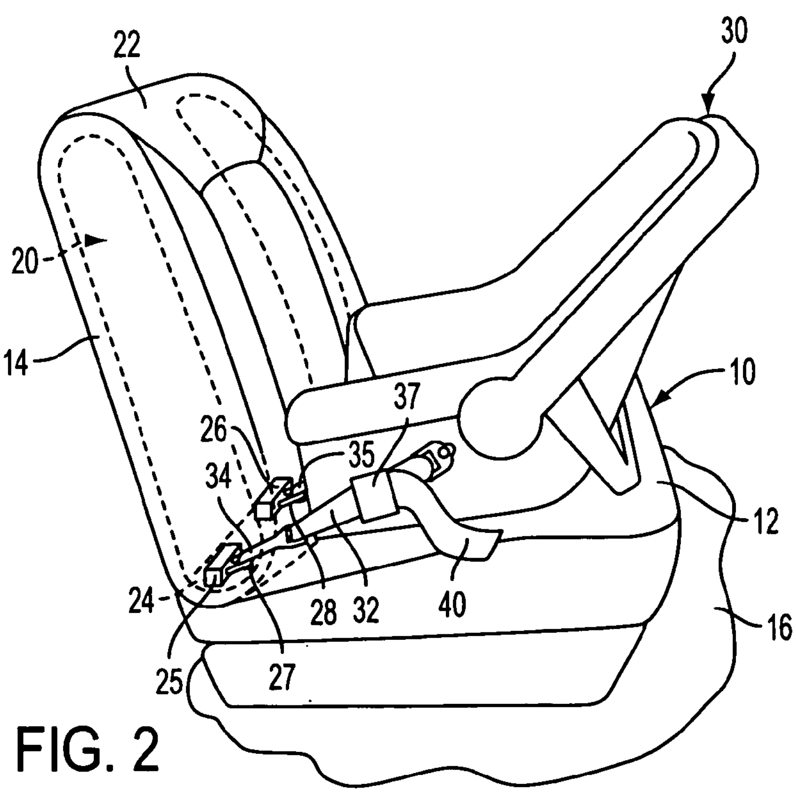
FIG. 2 is a side view showing a rearwardly facing child restraint seat attached to a front vehicle seat by utilizing a mounting anchor configured in accordance with the principles of the present invention.

Referring now to FIGS. 1 and 2 there is shown a front vehicle seat 10 having a seat portion 12 and a back portion 14. The back portion 14 is cantilevered to the seat portion 12 and the seat portion is anchored to the floor 16 of the vehicle. The back portion 14 has a rigid frame 20 therein which is covered by padding and upholstery 22. Attached to the rigid frame 14 is a cross bar 24, which has fixed thereto anchors 25 and 26 having coupling portions 27 and 28 to which a child restraint seat 30 is attached.

A child restraint seat 30 includes a pair of straps 31 and 32 thereon with hooked couplers 34 and 35. The straps 31 and 32 have fittings 36 and 37 which allow the straps to be adjusted in length between the child restraint seat 30 and the hooked couplers 34 and 35 by pulling on ends 39 and 40 of the straps. Thus, when the child restraint seat 30 is attached by the hooked couplers 34 and 35 to the anchor loops 27 and 28 of the anchors 25 and 26, and the ends 39 and 40 of the straps 31 and 32 are pulled, tension is applied to the straps and thus to the anchors 25 and 26.

In the illustrated embodiment, the vehicle seat 10 is a right front passenger seat for American road vehicles or a left front passenger seat for vehicles such as UK road vehicles. The illustrated child restraint seat 30 is an existing configuration, however the principles of the present invention may apply to other child restraint seat configurations. Only if a vehicle air bag is disabled should one consider mounting a child restraint seat 30 facing rearwardly as shown in FIG. 2. The arrangement according to the present invention increases the likelihood that air bags are in fact disabled. As is seen in FIG. 1, if the child restraint seat 30 is facing forward, a tether 43 with a hook 45 is hooked into either an anchor on the back 14 of the seat 10 or fixed to the vehicle frame supporting the floor 16 at a location behind the seat anchors 25 and 26.

Figure 3:
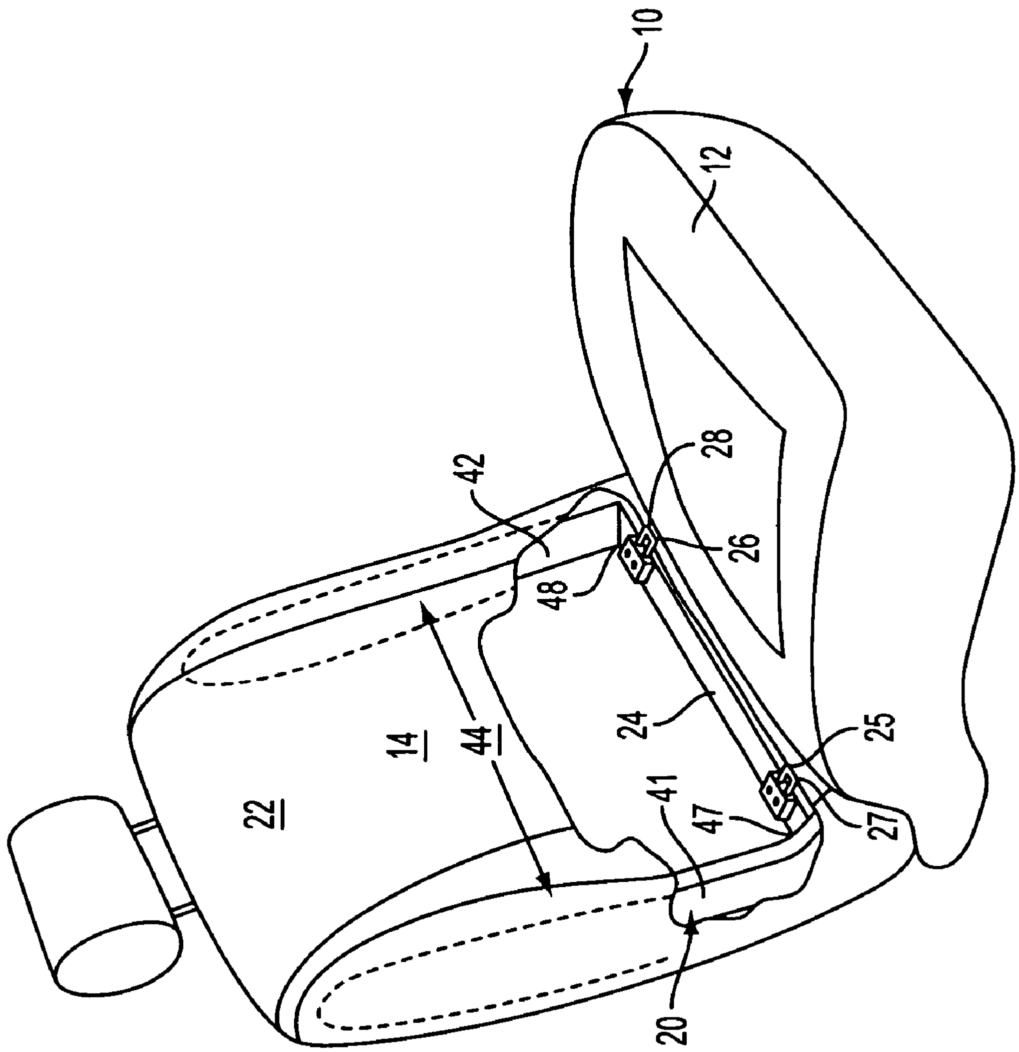
FIG. 3 is a perspective view, partially cut away, of a front vehicle seat modified in accordance with the principles of the present invention to anchor the child seats of FIGS. 1 and 2.

Referring now to FIG. 3 it is seen that the seat back frame 20 comprises vertical frame members 41 and 42 which are laterally spaced from one another by a distance 44. In accordance with a preferred embodiment of the present invention, the cross bar 24 which is part of the frame 20 extends between the frame members 41 and 42 at lower ends of the frame members and is fixed at opposite ends 47 and 48 thereto. The anchors 25 and 26, to which the hooked couplers 34 and 35 of the child restraint seat 30 are attached via the anchor loops formed by the coupling portions 27 and 28, are mounted on the cross bar 24 proximate the opposite ends 47 and 48 thereof. In accordance with the present invention, as the straps 31 and 32 are tightened by pulling the ends 39 and 40 of the straps, at least one of the anchors 25 or 26 move from a first position to a second position. The straps 31 and 32 need not be shortened if the straps are of a length to begin with that applies tension to the anchors 25 and 26 when the hooked couplers 34 and 35 are attached.

Figure 4:
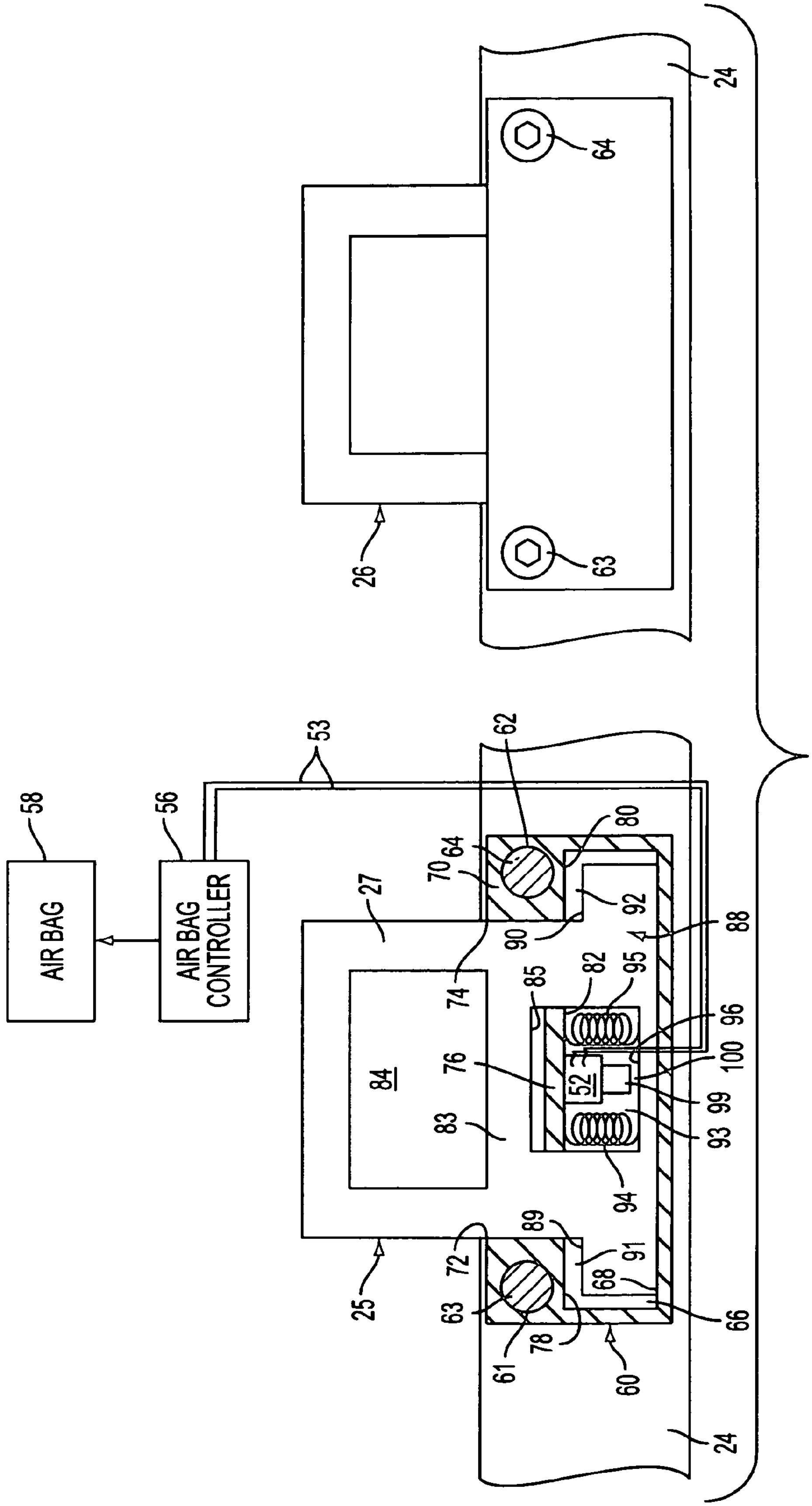
FIG. 4 is a top view, partially in elevation, of a first embodiment of the invention illustrating the position of a movable anchor, prior to attaching the child seat thereto.
Figure 5:
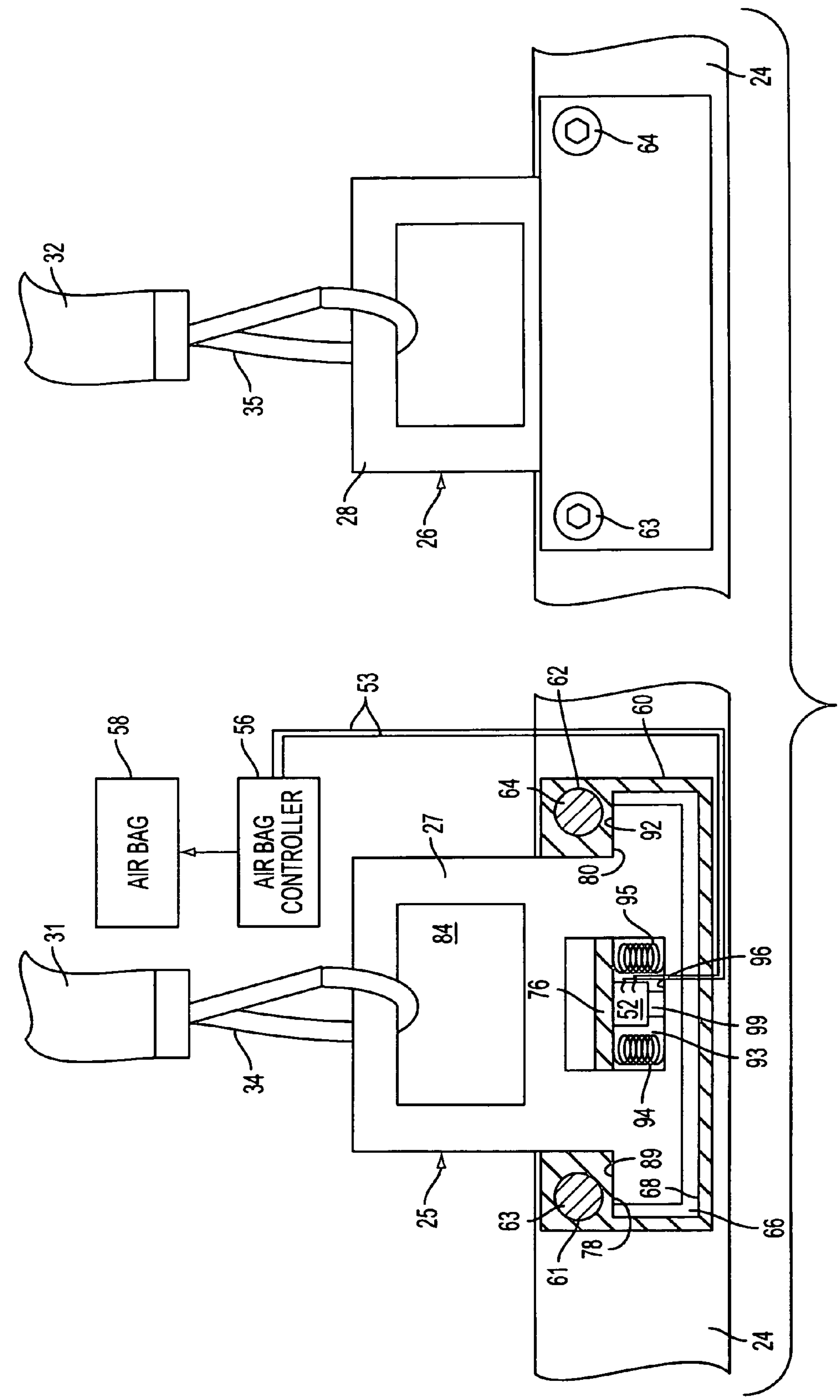
FIG. 5 is a view similar to FIG. 4, but showing a position of the movable anchor after attachment to the child seat thereto.

Referring now to FIGS. 4 and 5, it is seen in a first embodiment of the invention tat at least one of the anchors, preferably the outboard anchor 25, is an active anchor having a position sensor switch 52 therein which detects the presence of a child seat coupler hook 34 attached to its anchor loop 27. Upon detecting the presence of the hooked coupler 34, the position sensor switch 52 transmits a signal over a line 53 to an air bag controller circuit 56 that either disables an air bag 58 or reduces the inflation speed of the air bag. The sensor switch 52 only detects the presence of a child restraint seat 30 and thus operates independently of the presence of an occupant in the child seat.

The active anchor 25, illustrated in FIGS. 4 and 5, represents a preferred embodiment of an active anchor, wherein a housing 60 having a pair of bolt holes 61 and 62 is secured to the cross beam 24 of the vehicle seat back 14 by bolts 63 and 64 which pass through the bolt holes 61 and 62. The housing 60 has a chamber 66 therein having a rear wall 68 and a front wall 70. The front wall 70 has a pair of openings 72 and 74 therethrough which are separated by a front wall portion 76. The front wall 70 defines a pair of shoulders 78 and 80 while the front wall portion 76 has a reduced thickness and an internally facing surface 82. While only the movable anchor 25 is shown as active, the anchor 26 could also be made active by having the configuration of movable anchor 25.

The coupling portion 27 of the movable anchor 25, which is in the form of a loop, projects through the openings 72 and 74 in the front wall 70 and has a cross bar 83 which defines the back surface of an opening 84 forming the loop of the coupling portion. The cross bar 83 also has a rear surface 85, which is preferably spaced from the intermediate wall portion 76.

Extending through the openings 72 and 74 and the front wall 70 is a mounting portion 88 of the movable anchor 25. The mounting portion 88 has a pair of laterally projecting shoulders 89 and 90 positioned opposite the stop surfaces 78 and 80, respectively, which are spaced by gaps 91 and 92 from the shoulders 89 and 90, respectively.

The mounting portion 88 of the movable lug 25 has a recess 93 therein which receives the intermediate wall portion 76, a pair of coil springs 94 and 95, as well as the switch 52. The coil springs 94 and 95 bear against a rear wall 96 of the recess 93 and against the rear surface 82 of the intermediate portion 76 of front wall 70.

As is further seen in FIG. 4, since the coil springs 94 and 95 are under compression, the coil springs push the mounting portion 88, and thus the movable anchor 25, back into engagement with the rear wall 68 of the housing 60. The springs 94 and 95 are under sufficient compression so that it takes 8 to 15 pounds of force to move the movable anchor 25 against the bias of the springs. Preferably, this force is about 10 pounds. Thus, an impact against the vehicle in which the movable anchor 25 is employed, does not generate sufficient force to overcome the compressive force of the springs 94 and 95. Consequently, the springs 94 and 95 will hold the movable anchor 25 in the first position of FIG. 4 during an impact.

While in the first position, the shoulders 89 and 90 are separated from the front wall stop surfaces 78 and 80 by the gaps 91 and 92, while an actuator 99 of the micro switch 52 is spaced from the rear wall 96 of the recess 93 by a second gap 100. The second gap 100 is narrower than the first gaps 91 and 92 so that when the movable lug 25 moves from the first position of FIG. 4 to the second position of FIG. 5, the rear wall 96 of the recess 93 contacts and pushes the actuator 99 of the switch 52 prior to the shoulders 89 and 90 abutting the stop surface walls 78 and 80. This ensures that the switch 52 is actuated when the movable anchor 25 is shifted to the second position. The gaps 97 and 98 are in the range of 1 to 4 mm, preferably about 2 mm; while the gap 100 between the actuator 99 and rear wall 96 of the recess 93 is preferably about 1 mm or less.

As is seen in FIG. 5, upon attaching the hooked couplers 34 and 35 to the anchors 25 and 26 and tensioning at least the strap 31, the movable anchor 25 moves from the FIG. 4 position to the FIG. 5 position where the switch 52 is actuated while the shoulders 89 and 90 abut the stop walls 78 and 80. Since the switch 52 operates the air bag controller 56 to disable deployment of the air bag 58, and the movable anchor 25 is now pressed positively against the first stop surfaces 78 and 80, an impact will transfer force from the seat 30 through the strap 31 and hooked coupling 34 to the movable anchor 25. The movable anchor 25 bears against the housing 60 that is anchored to the cross beam 24 in the seat back frame 20. Thus, the child restraint seat 30 and child therein are restrained without deployment or with reduced speed deployment of the air bag 58.

In the preferred embodiment the micro switch 52 in a first state is normally “off”, i.e., is off in the position of FIG. 4, so that it does not continuously draw current when the child restraint seat 30 is not attached to the vehicle seat. The decision to configure micro switch as normally “off” instead of normally “on” in a first state is based on the likelihood that the child seat 30 will not be attached to the front seat 10 for the majority of the time the vehicle is used. Consequently, it is in accordance with the principles of the present invention to have the micro switch 52 normally open or “off” and only closed or “on” when the child restraint seat 30 is mounted on the vehicle seat 10 and attached to at least the movable anchor 25 to move the switch to a second state.

The micro switch 52 is preferably arranged in a micro switch assembly, which assembly includes two resistors used for diagnostics in proximity with the micro switch. For example, a resistor of 100 ohms is placed in series with a movable contact within a micro switch 52 while a 1 K resistor is in parallel with the contact. The micro switch 52 can be mechanical, resistive, magnetic, strain sensing, capacitive or any other type of switch effective for the disclosed purpose of closing or opening in response to attachment of the hooked coupler 34 to the movable anchor 25.

Figure 6:
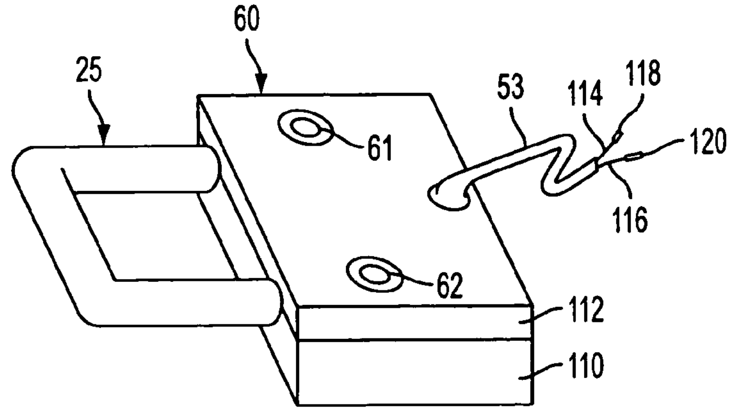
FIG. 6 is an isolated perspective view of an unattached movable anchor configured according to the present invention.

As is seen in FIG. 6, the movable anchor 25 is a modular unit with a base 110 and a cover 112. The line 53 to the air bag controller 56 (FIGS. 4 and 5) is configured as a pair of leads 114 and 116 having electrical connectors 118 and 120 that couple with long leads (not shown) from the air bag controller 56. By configuring the movable anchor 25 as a modular unit, incorporation of the movable anchor 25 in existing designs for vehicle seats is facilitated.

Figure 7:
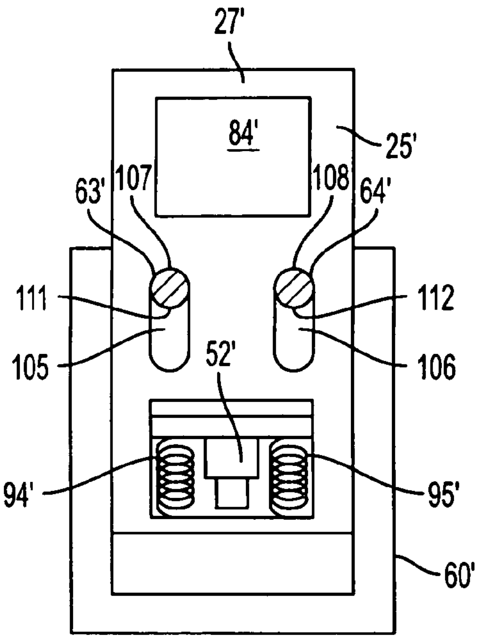
FIG. 7 is a top elevation of a second embodiment of an anchor configured in accordance with the principles of the present invention.

Referring now to FIG. 7, while the configuration of FIGS. 4 and 5 is preferred, the movable anchor 25' may have other configurations such as that of FIG. 7 in which the bolts 63' and 64' are received in slots 105 and 106 disposed in the mounting portion 88' of the movable anchor. In this configuration, first side surfaces 107 and 108 of the bolts 63' and 64' provide the first stop surfaces for the movable anchor 25', while second side surfaces 111 and 112 of the bolts 63' and 64' provide second stop surfaces for the movable anchor 25'. This is because the coil springs 94' and 95' urge the movable anchor 25' in a direction into the housing 60'.

Figure 8:
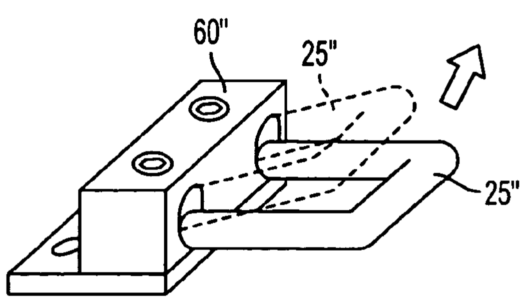
FIG. 8 is a perspective view of a third embodiment of an anchor configured in accordance with the principles of the present invention.

Referring now to FIG. 8, there is shown another embodiment of the invention wherein a movable anchor 25" pivots from a first position, in which the child seat 30 is not attached to the movable anchor, to a second position (dotted lines) in which the movable anchor 25" is lifted upon coupling the hooked coupler 34 of the child seat thereto. In the arrangement of FIG. 8, the movable anchor 25" is biased to the first solid line position and pivots against the bias of a spring to the dotted line position, the pivoting motion operating a position sensing switch within the housing 60" that disables the air bag.

From the foregoing description, one skilled in the art can easily ascertain the essential characteristics of this invention, and without departing form the spirit and scope thereof, can make various changes and modifications of the invention to adapt it to various usages and conditions.

We claim:

1. A child restraint seat anchor device that detects independent of the presence of a seat occupant whether a child restraint seat is attached to a vehicle seat, the child restraint seat anchor device comprising:

a housing adapted to be fixed to the vehicle seat;

a movable anchor having a coupler portion and mounting portion, the coupler portion being adapted to couple with a coupler on the child restraint seat and the mounting portion being received in the housing; the moveable anchor being shiftable within the housing from a first position, indicating that a child seat is not attached to the vehicle seat, to a second position, indicating that a child seat is attached to the vehicle seat;

at least one spring applying a bias to the movable anchor to urge the movable anchor to the first position;

a stop engaged by the movable anchor when the movable anchor has shifted to the second position, when engaged by the movable anchor the stop transferring force applied by the coupler of the child restraint seat to the vehicle seat, and a switch in operative association with the movable anchor and operable independent of a seat occupant, the switch having a first and a second state and being adapted for connection to an air bag to disable deployment of the air bag or to reduce deployment speed of the air bag only when in the second state upon the movable anchor being shifted to the second position, and the switch allowing deployment of the air bag at normal speed when in the first state while the movable anchor is in the first position.

2. The device of claim 1, wherein the movable anchor positively engages the stop upon shifting to the second position.

3. The device of claim 2 wherein the switch is a normally open switch which is closed upon the movable anchor being shifted to the second position.

4. The device of claim 3 wherein the switch is a micro switch having an actuator spaced from the movable anchor when the movable anchor is in the first position and engaged by the movable anchor when the movable anchor has shifted to the second position.

5. The device of claim 1 wherein the housing includes a chamber having an opening through a front wall thereof which the coupler portion of the movable anchor extends, the chamber receiving the mounting portion of the movable anchor, the chamber having a rear wall defining the first stop that is spaced a selected distance from a front wall, which front wall defines the second stop.

6. The device of claim 5 wherein the mounting portion of the movable anchor includes shoulder portions which engage the front wall adjacent to the opening through which the coupling portion of the movable anchor extends.

7. The device of claim 6 wherein the mounting portion of the movable anchor includes a recess therein in which the at least one spring and the micro switch are positioned.

8. The device of claim 7 wherein the at least spring has a first end abutting a portion of the front wall of the housing disposed within the recess and a second end engageable by a rear wall of the recess in the movable anchor.

9. The device of claim 8 wherein there are two springs with the micro switch positioned therebetween.

10. The device of claim 9 including bolt holes through the front wall adapted to receive bolts for fixing the device to a vehicle seat.

11. The arrangement of claim 1 wherein the switch has only a first state and a second state.

12. The arrangement of claim 1 wherein the anchor is independent of a seat belt or seat belt anchor.

13. An arrangement for attaching a child restraint seat to the frame of a seat back of a vehicle seat, the arrangement comprising:

a pair of child restraint seat anchors positioned in spaced relation to one another on the frame of the seat back, at least one of the anchors being a movable anchor disposed in a housing fixed to the seat back and being shiftable between a first position, indicating that the child seat is not attached, and a second position indicating that a child seat is attached;

at least one spring disposed between a wall of the housing and the movable anchor for urging the movable anchor to the first position;

a first stop within the housing engaged by the movable anchor when the movable anchor is in the first position;

a second stop within the housing engageable by the movable anchor when the movable anchor has shifted to the second position, when engaged by the movable anchor, the second stop transferring force applied by the coupler of the child restraint seat to the vehicle seat, and a switch in operable association with the movable anchor and operable independent of the presence of a seat occupant, the switch having a first state and a second state and being adapted for connection to an air bag to disenable deployment of the air bag or to decrease deployment speed of the air bag only when in the second state upon the movable anchor being moved to the second position, the switch allowing deployment of the air bag at normal speed when in the first state while the movable anchor is in the first position.

14. The arrangement of claim 13 wherein the switch is a normally open electrical switch.

15. The arrangement of claim 14 wherein the switch is within the housing.

16. The arrangement of claim 13 wherein the second stop is positively engaged by the movable anchor when the movable anchor is moved to the second position by attachment of the child restraint seat to the movable anchor.

17. The arrangement of claim 13 wherein the movable anchor is slidably mounted for sliding between the first and second positions.

18. The arrangement of claim 13 wherein the movable anchor is pivotably mounted for pivoting between the first and second positions.

19. The arrangement of claim 13 wherein the switch has only a first state and a second state.

20. The arrangement of claim 19 wherein the child seat is secured to the vehicle seat independently of a seat belt and seat belt anchor.

* * * * *